United States Patent
Cameron et al.

(10) Patent No.: US 6,649,711 B2
(45) Date of Patent: Nov. 18, 2003

(54) PROCESS FOR PREPARING VINYLIC POLYMERS WITH CATALYST SYSTEM CONTAINING METAL COMPLEX AND LEWIS ACID

(75) Inventors: Paul Alexander Cameron, Northallerton (GB); Vernon Charles Gibson, London (GB); Derek John Irvine, Stockton on Tees (GB)

(73) Assignee: Imperial Chemical Industries PLC, London (GB)

( * ) Notice: Subject to any disclaimer, the term of this patent is extended or adjusted under 35 U.S.C. 154(b) by 70 days.

(21) Appl. No.: 09/750,176

(22) Filed: Dec. 29, 2000

(65) Prior Publication Data

US 2002/0022703 A1 Feb. 21, 2002

Related U.S. Application Data

(63) Continuation of application No. PCT/GB99/01769, filed on Jun. 4, 1999.

(30) Foreign Application Priority Data

Jun. 29, 1999 (GB) .............................................. 9813943

(51) Int. Cl.$^7$ .................................................. C08F 4/44
(52) U.S. Cl. ........................ 526/125.1; 526/90; 526/96; 526/113; 526/125.6; 526/135; 526/139; 526/179; 526/303.1; 526/309; 526/341; 526/319; 526/943; 526/329.7; 528/323; 528/326; 528/357; 528/359
(58) Field of Search ................................ 526/329, 134, 526/279, 303.1, 309, 341, 943, 171, 329.7; 528/319, 323, 326, 357, 359

(56) References Cited

U.S. PATENT DOCUMENTS

| | | | | |
|---|---|---|---|---|
| 3,922,323 A | * | 11/1975 | Reese et al. ................. | 523/451 |
| 4,142,055 A | * | 2/1979 | Schneider et al. ........... | 560/116 |
| 5,668,234 A | | 9/1997 | Rhodes ..................... | 526/329.7 |
| 5,907,021 A | * | 5/1999 | Turner et al. ................ | 526/160 |
| 6,492,086 B1 | * | 12/2002 | Barclay et al. .......... | 430/270.1 |

FOREIGN PATENT DOCUMENTS

| | | | | |
|---|---|---|---|---|
| JP | 358202441 | * | 11/1983 | ............ G03C/1/72 |
| WO | 96/37529 | | 11/1996 | |

OTHER PUBLICATIONS

Inoue et al., Metalloporphyrin Catalysts for Living and Immortal Polymerizations, Macromol. Symp. vol. 101, 1996 pp. 11–18.

* cited by examiner

*Primary Examiner*—Tatyana Zalukaeva
(74) *Attorney, Agent, or Firm*—Pillsbury Winthrop LLP

(57) ABSTRACT

A polymerisation process for the preparation of vinylic polymers from the corresponding vinylic monomers which process comprises the step of reacting a vinylic monomer in the presence of a catalyst system comprising a) a metal complex of general formula (I) where A is selected from the group consisting of nickel, iron, cobalt, chromium, manganese, titanium, zirconium, vanadium and the rare earth metals; $L^1$, $L^2$, $L^3$ and $L^4$ are ligands and b) a Lewis acid of general formula (II) wherein at least one of W, Y or Z is capable of forming a co-ordination bond with A and the others of W, Y and Z are bulky groups; D is selected from the group consisting of aluminium, magnesium, zinc and boron.

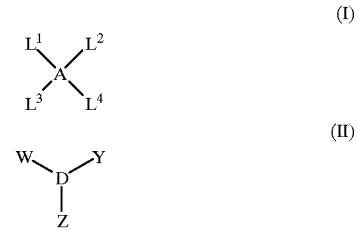

11 Claims, No Drawings

PROCESS FOR PREPARING VINYLIC POLYMERS WITH CATALYST SYSTEM CONTAINING METAL COMPLEX AND LEWIS ACID

This application is a continuation of PCT/GB99/01769, filed Jun. 4, 1999.

The present invention relates to a polymerisation process for the preparation of vinylic polymers in the presence of a catalyst system.

Living or immortal polymerisation is a type of polymerisation that does not terminate naturally. Each initiator molecule produces one growing chain such that the polymer grows linearly with time. Therefore the degree of polymerisation can be controlled to some extent. This method has been developed by Inoue for the living polymerisation of both methacrylates and acrylates using aluminium porphyrins, of the general formula (TPP)AlX, as initiators with irradiation from a xenon arc (Polym. Prepr. Jpn. (English Edition) 1992, 41, E93(IIID-06) and E96(IIID-12).

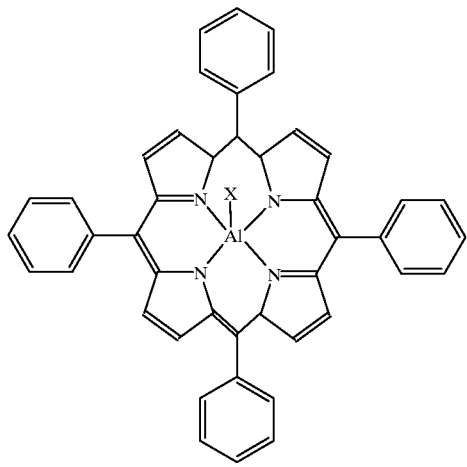

(TPP)AlX where $X = CH_3$ or $CH_2CH_2CH_3$

At ambient temperature each (TPP)AlX molecule was found to generate a polymer chain and excellent control of molecular weight was achieved.

Subsequently Inoue discovered that the further addition of a Lewis acid greatly enhances the rate of propagation. For example (TPP)AlMe initiated polymerisation of methylmethacrylate (MMA), in the presence of irradiated light, was found to yield 6.1% polymethylmethacrylate after 2.5 hours. With the addition of a Lewis acid, for example a bulky aluminium phenoxide, there was quantitative polymerisation within 3 seconds. More recently Inoue has disclosed such systems where the presence of irradiated light is not required. For example (TPP)AlX, where X=SPropyl, initiated polymerisation of MMA in the presence of a Lewis acid, where there is complete monomer conversion after 1.5 minutes at 80° C. (T Kodeira and K Mori, Makromol. Chem. Rapid Commun. 1990, 11, 645). However the molecular weights that have been produced with this system have been low, for example 22,000.

It is reported, by Inoue, that the initial reaction is of the (TPP)AlX complex with monomer to form an enolate initiator, in the presence of irradiated light. This enolate can then react with further monomer in the presence of the Lewis acid, as activator, to develop the polymer chain.

E. A. Jeffery et al, in Journal of Organometallic Chemistry (1974, 74, p365,373), have disclosed the use of Nickel (acetylacetonate)$_2$ to catalyse the formation of aluminium enolates by encouraging 1,4-addition of trimethylaluminium to α,β-unsaturated ketones. Nickel complexes which catalyse the formation of enolates are relevant to polymerisations which proceed via a metal enolate including existing metallocene initiators based on samarium and zirconium.

It is an object of the invention to provide a catalyst system, for the polymerisation of vinylic monomers to the corresponding polymers, such that the polymerisation occurs quickly and may be controlled.

Accordingly the present invention provides a polymerisation process for the preparation of vinylic polymers from the corresponding vinylic monomers which process comprises the step of reacting a vinylic monomer in the presence of a catalyst system comprising a) a metal complex of general formula (I)

where A is selected from the group consisting of nickel, iron, cobalt, chromium, manganese, titanium, zirconium, vanadium and the rare earth metals; $L^1$, $L^2$, $L^3$ and $L^4$ are ligands and b) a Lewis acid of general formula (II)

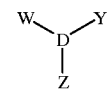

wherein at least one of W, Y or Z is capable of forming a co-ordination bond with A and the others of W, Y and Z are bulky groups; D is selected from the group consisting of aluminium, magnesium, zinc and boron.

By rare earth metals we mean lanthanum and the lanthanide series.

The vinylic polymers that can be produced according to this invention include homo and copolymers of the corresponding vinylic monomers such as alkyl (alk)acrylic acid and esters thereof, functionalised alkyl(alk)acrylic acid and esters thereof, for example hydroxy, halogen, amine functionalised, styrene, vinyl acetates, butadiene. By (alk) acrylic, we mean that either the methacrylic or the analogous acrylic may be used. For both homo and copolymers the monomers are preferably alkyl (alk)acrylic acid and esters thereof, more preferably alkyl(meth)acrylates. These polymerisations can be conducted in such a way that architectural copolymers, for example block, ABA and stars, can be produced.

Polymerisation can be undertaken in the presence of a solvent, for example toluene, dichloromethane and tetrahydrofuran, or in the bulk monomer. The polymerisation is preferably undertaken at between −100 and 150° C., more preferably between −50 and 50° C., in particular between 15 to 40° C.

The metal, A, in compound (II) is preferably iron, cobalt or nickel and more preferably nickel. The metal may exist in a variety of oxidation states, for example 0, 1, 2 or 3. The ligands $L^1$, $L^2$, $L^3$ and $L^4$ may be represented by all monodentate ligands, a combination of 2 mono and 1 bidentate ligand, where one pair of ligands from $L^1$, $L^2$, $L^3$ and $L^4$ represent a bidentate ligand and the other two ligands from $L^1$, $L^2$, $L^3$ and $L^4$ represent two separate monodentate ligands, or 2 bidentate ligands. Preferably $L^1$, $L^2$, $L^3$ and $L^4$ represent 2 bidentate ligands, more preferably 2 bidentate acetylacetonate ligands or 2 bidentate cyclooctadiene ligands.

In compound (II) the grouping linked to D chosen from one of W, Y or Z, which itself is capable of forming a co-ordination bond with A, is preferably chosen from the group consisting of alkyl, halogen, alkoxy, aryloxy and ester, more preferably it is an alkyl group with preferably $C_1$ to $C_{10}$ carbon atoms and more specifically methyl. The remaining bulky groups are preferably the same, in particular phenoxide or a substituted phenoxide or thiolate. D is preferably aluminium. Without wishing to be limited by theory we believe that the initial reaction involves transfer of one of the groupings W, Y or Z from D in compound (II) to the metal, A, in compound (I). Therefore it is essential to the process of the present invention that at least one of W, Y or Z is capable of forming a bond with A.

Within the catalyst system the ratio of the number of moles of compound (I) to moles of compound (II) preferably ranges from 1:0.1 to 1:100, more preferably from 1:0.2 to 1:10. Specifically preferred is a system where the ratio of number of moles of compound (I) to moles of compound (II) is 1:3. These catalyst systems can be used as according to the process of the invention for the polymerisation of monomer concentrations ranging from 1 to 20,000 moles relative to number of moles of compound (I).

Whilst it is acknowledged that the polymerisation time is dependent on monomer and solvent type, amongst other factors, typically polymerisation is complete in less than 5 minutes for homopolymers. The homopolymers and copolymers prepared by the process of the invention by solution polymerisation may have a syndiotactic content higher than that obtained for the same homopolymer or copolymer prepared by a well established solution anionic or free radical polymerisation process.

The present invention is illustrated by reference to the following examples.

EXAMPLE 1

Preparation of Polymethylmethacrylate (PMMA)

A solution of MMA (1 g, 200 mole equivalent of compound (I)) in dichloromethane (2 ml) (DCM) was prepared in a flask under nitrogen. Into a second flask nickel acetylacetonate (12.8 mg, 0.05 mol) (compound I) and methylaluminium bis(2,6-di-tert-butyl-4-methylphenoxide) (72.0 mg, 0.15 mol) (compound II) were added under nitrogen. The MMA in DCM was added to the second flask and the reaction mixture was stirred for 5 minutes. Methanol (0.5 ml) was added to quench the reaction and the reaction mixture was diluted with DCM (10 ml). The PMMA was precipitated from a 10 fold excess of acidified (1% hydrochloric acid) methanol.

The percentage yield of PMMA was 95%.

In this example the molar ratio of compound (I) to compound (II) was 1:3 and the reaction occurred at ambient temperature.

The PMMA had an actual molecular weight of 118,300 compared to the calculated value of 20,000. This calculated value is based on the nickel (acetylacetonate)$_2$. The polydispersity was 1.63 and the percentage syndiotacticity was 72%.

The PMMA tacticity was calculated by measuring the relative integrals of the triad (three consecutive monomer units) signals from the $^1$H NMR of PMMA at 250 MHz on a Bruker AC-250 machine. These triads correspond to syndiotactic, isotactic and heterotactic content.

$M_n$, and polydispersity values were determined by Gel Permeation Chromatography (GPC). The GPC detector used was a Knauer differential refractometer with Viscotek Trisec software. Samples were injected on to two linear 10 micron columns (calibrated using polystyrene standards) using chloroform as eluant at a flow rate of 1 ml/min.

What is claimed is:

1. A polymerisation process for the preparation of a polymer from the corresponding monomer of at least one of alkyl(alk)acrylic acid and esters thereof, functionalised alky (alk)acrylic acid and esters thereof, vinyl acetate or mixture thereof, which process comprises reacting said corresponding monomer in the presence catalyst system comprising
    a) a metal complex of general formula (I)

where A is nickel, iron or cobalt; $L^1$, $L^2$, $L^3$ and $L^4$ are ligands and
   b) a Lewis acid of general formula (II)

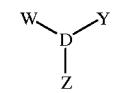

wherein at least one of W, Y or Z is a $C_{1-10}$-alkyl group capable of forming a co-ordination bond with A and at least one of the others of W, Y and Z are bulky groups; and D is aluminium, magnesium, zinc or boron.

2. A polymerisation as claimed in claim 1 wherein the ligands $L^1$, $L^2$, $L^3$ and $L^4$, in compound (I), are chosen from all monodentate, a combination of 2 mono and 1 bidentate ligand or 2 bidentate ligands.

3. A polymerisation as claimed in claim 1 wherein D, in compound (II), is aluminium.

4. A polymerisation as claimed in claim 1 wherein the ratio of the number of moles of compound (I) to moles of compound (II) ranges from 1:0.1 to 1:100.

5. A polymerisation as claimed in claim 1 wherein the ratio of the number of moles of compound (I) to moles of compound (ii) ranges from 1:0.2 to 1:10.

6. A polymerisation process far the preparation of vinylic polymer from the corresponding vinylic monomer, which process comprises reacting said corresponding monomer in the presence of a catalyst system comprising
    a) a metal complex of general formula (I)

where A is nickel, iron, cobalt, chromium, manganese, titanium, zirconium, vanadium, or a rare earth metal; $L^1$, $L^2$, $L^3$ and $L^4$ are ligands and
   b) a Lewis acid of general formula (II)

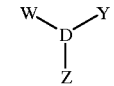

wherein at least one of W, Y or Z is a $C_{1-10}$-alkyl groups capable of forming a co-ordination bond with A and at least one of the others of W, Y and Z are phenoxide, substituted phenoxide, or thiolate bulky groups; and D is aluminium, magnesium, zinc or boron.

7. A polymerisation process according to claim 6, wherein the vinylic monomer is at least one of alkyl(alk)acrylic acid or ester thereof, functionalised alkyl(alk)acrylic acid or ester thereof, vinyl acetate, or mixture thereof.

8. A polymerization process according to claim 7, wherein A is nickel, iron or cobalt.

9. A polymerization process according to claim 6, wherein A is nickel, iron or cobalt.

10. A polymerisation process for the preparation of a polymer from the corresponding monomer of at least one of alkyl(alk)acrylic acid and esters thereof, functionalised alky(alk)acrylic acid and esters thereof, vinyl acetate or mixture thereof, which process comprises reacting said corresponding monomer in the presence of a catalyst system comprising a) a metal complex of general formula (I)

where A is nickel, iron or cobalt; $L^1$, $L^2$, $L^3$ and $L^4$ are ligands and b) a Lewis acid of general formula (II)

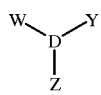

wherein W is a $C_{1-10}$-alkyl group capable of forming a co-ordination bond with A, and Y and Z are bulky groups; and D is aluminium, mangesium, zinc or boron.

11. A polymerisation process for the preparation of vinylic polymer from tile corresponding vinylic monomer, which process comprises reacting said corresponding monomer in the presence of a catalyst system comprising a) a metal complex of general formula (I)

where A is nickel, iron, cobalt, chromium, manganese, titanium, zirconium, vanadium, or a rare earth metal; $L^1$, $L^2$, $L^3$ and $L^4$ are ligands and b) a Lewis acid of general formula (II)

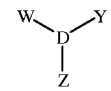

wherein W a $C_{1-10}$-alkyl group capable of forming a co-ordination bond with A and Y and Z are phenoxide, substituted phenoxide, or thiolate bulky groups; and D is aluminium, mangesium, zinc or boron.

* * * * *